United States Patent
Klingström et al.

(10) Patent No.: US 10,809,800 B2
(45) Date of Patent: Oct. 20, 2020

(54) ROBUST CONVERGENCE SIGNAL

(71) Applicant: Tobii AB, Danderyd (SE)

(72) Inventors: Andreas Klingström, Danderyd (SE); Per Fogelström, Danderyd (SE)

(73) Assignee: Tobii AB, Danderyd (SE)

( * ) Notice: Subject to any disclaimer, the term of this patent is extended or adjusted under 35 U.S.C. 154(b) by 10 days.

(21) Appl. No.: 16/220,760

(22) Filed: Dec. 14, 2018

(65) Prior Publication Data
US 2019/0369719 A1    Dec. 5, 2019

Related U.S. Application Data

(60) Provisional application No. 62/678,539, filed on May 31, 2018.

(51) Int. Cl.
| | | |
|---|---|---|
| G06F 3/01 | (2006.01) | |
| G02B 27/00 | (2006.01) | |
| G02B 27/01 | (2006.01) | |

(52) U.S. Cl.
CPC ......... G06F 3/013 (2013.01); G02B 27/0093 (2013.01); G02B 27/017 (2013.01); G02B 27/0179 (2013.01); G02B 2027/0187 (2013.01)

(58) Field of Classification Search
CPC ... G06F 3/013; G02B 27/0093; G02B 27/017; G02B 27/0179; G02B 2027/0187
See application file for complete search history.

(56) References Cited

U.S. PATENT DOCUMENTS

| | | | |
|---|---|---|---|
| 9,143,880 B2* | 9/2015 | Vennstrom | G06F 3/167 |
| 10,346,128 B2* | 7/2019 | Vennstrom | H04S 7/308 |
| 10,416,725 B2* | 9/2019 | Eskilsson | G06F 1/163 |
| 10,534,982 B2* | 1/2020 | Linden | G06K 9/6262 |
| 10,558,895 B2* | 2/2020 | Linden | G06T 7/74 |
| 2002/0099257 A1 | 7/2002 | Parker et al. | |
| 2004/0212776 A1* | 10/2004 | Spitzer | G02B 27/0081 351/41 |
| 2011/0075257 A1* | 3/2011 | Hua | H04N 13/322 13/322 |

(Continued)

OTHER PUBLICATIONS

Extended European Search report dated Oct. 16, 2019 in related application No. EP19177632, all pgs.

*Primary Examiner* — Ricardo Osorio
(74) *Attorney, Agent, or Firm* — Samuel Yamron

(57) ABSTRACT

A method and a corresponding eye tracking system for providing an approximate gaze convergence distance of a user in an eye tracking system are disclosed. The method comprises determining calibration data in relation to interpupillary distance between a pupil of a left eye and a pupil of a right eye of a user, determining, based on the determined calibration data, a gaze convergence function providing an approximate gaze convergence distance of the user based on a determined interpupillary distance of the user. The method further comprises receiving, from one or more imaging devices, one or more images of the left eye and the right eye of the user, determining a current interpupillary distance of the user based on the one or more images and determining a current approximate gaze convergence distance based on the current interpupillary distance and the gaze convergence function.

20 Claims, 8 Drawing Sheets

(56) References Cited

U.S. PATENT DOCUMENTS

| | | | |
|---|---|---|---|
| 2012/0147328 A1* | 6/2012 | Yahav | A61B 3/113 351/210 |
| 2013/0178287 A1* | 7/2013 | Yahav | G02B 27/01 463/32 |
| 2015/0104757 A1 | 4/2015 | Moncrief et al. | |
| 2016/0167672 A1 | 6/2016 | Krueger | |
| 2017/0336638 A1* | 11/2017 | Bos | G02B 27/0093 |

* cited by examiner

ROBUST CONVERGENCE SIGNAL

CROSS REFERENCE TO RELATED APPLICATIONS

The application claims priority to, and the benefit of, U.S. Provisional Application No. 62/678,539, filed May 31, 2018, the entire disclosure of which is hereby incorporated by reference for all purposes.

TECHNICAL FIELD

The present disclosure generally relates to the field of eye tracking. In particular, the present disclosure relates to a method and system providing an approximate gaze convergence distance of a user.

BACKGROUND

In some applications including eye/gaze tracking, such as virtual reality (VR) and augmented reality (AR) applications, a gaze convergence distance is an important input from an eye tracking system.

When determining a gaze convergence distance in known eye tracking systems, a gaze vector from a right eye and a gaze vector from a left eye are calculated in the eye tracking system and the intersection between these vectors is calculated to determine the convergence distance. Problems arise with this way of determining convergence distance in that the gaze vectors in relation to the eyes will include noise of varying size. Furthermore, small angle errors in the gaze vectors will result in a large error in the gaze convergence distance.

It would be desirable to provide an eye tracking technology that reduces the error in a determined gaze convergence distance of the known methods.

SUMMARY

An object of the present disclosure is to address the issues of known systems and methods.

According to a first aspect, there is provided a method for providing an approximate gaze convergence distance of a user in an eye tracking system. In the method, calibration data in relation to interpupillary distance between a pupil of a left eye and a pupil of a right eye of a user are determined and based on the determined calibration data, a gaze convergence function providing an approximate gaze convergence distance of the user based on a determined interpupillary distance of the user is determined. Furthermore, one or more images of the left eye and the right eye of the user are received from one or more imaging devices and a current interpupillary distance of the user is determined based on the one or more images. Finally, a current approximate gaze convergence distance is determined based on the current interpupillary distance and the gaze convergence function.

The aspect is based at least partly on an insight that an approximate convergence distance for a user's eyes can be determined as a function of the interpupillary distance of the user and that determining convergence distance based on the interpupillary distance is less sensitive to noise at least for some intervals of convergence distance than determining convergence distance based on determined gaze vectors of the user's eyes.

Advantages of the aspect is for example robust convergence distance measurements and low power usage.

The term gaze convergence distance is used here to describe a distance from a point in relation to a user's eyes to a point where the user is currently focusing. The point in relation to the user's eyes could for example be a point halfway between the rotation centers of the user's eyes.

The term calibration data is used here to refer to data for calibrating a method to a specific user, a specific eye tracking system and/or other varying factors. For example, interpupillary distance for users focusing at a specific depth of field differs between users due to differing anatomy of the users. Furthermore, depending on the type of system and other factors, the length between a user's eyes and imaging devices used to capture images used in the method will differ. The calibration data required will generally differ depending on the gaze convergence function used.

The approximate gaze convergence distance of the user may be employed for determining a current gaze point of the user. Data indicating the current gaze point may be retrieved from a gaze tracking function, and may in some examples be used for mitigating motion sickness e.g. in a system using a head mounted display (HMD) for VR or AR. An example of such an application will be described in the following.

Real world motion sickness generally occurs when a person's eyes are providing conflicting signals about motion and orientation from the signals provided by vestibular sensors in the inner ear. In real life, for example keeping an eye on the horizon while traveling on a boat or looking at the road ahead while riding in a care are proven methods of relieving motion sickness symptoms.

In AR and VR, finding such 'horizon' is not feasible in every scene image, wherein the scene image is displayed on a display device of AR/VR HMD. In order to mitigate VR/AR user's motion sickness, a visual indication that provides visual information to a user of the current orientation of the HMD in real space may be superimposed, wherein the visual information may comprise for example a grid-like (or other pattern) image with specific size and shape and at least surrounding a foveated region based on relative movement between a motion (detected by gyro and/or accelerometer) of HMD and characteristics of a scene image.

In such example, data from a gaze tracking function are received, indicating a current gaze point of the user. Furthermore, the visual indication may then comprise an occlusion region including the current gaze point of the user such that the visual indication is not disclosed in the occlusion region.

The occlusion region can be introduced around a current gaze point to avoid the visual indication obscuring what the user is currently looking at. The occlusion region preferably at least substantially matches the fovea part of the retina of the user's eye which is the portion of the retina that provides the clearest vision.

The size of the occlusion region is generally a tradeoff between the efficiency of mitigating motion sickness and limiting distraction to the user. Reducing the size of the occlusion region will generally increase the efficiency of mitigating motion sickness and at the same time increase the distraction of the user since the visual indication used is generally introduced to orient the user's visual perception in relation to horizontal and vertical direction in relation to real space.

Furthermore, the level of transparency (opacity) of the visual indication, or in other words how much the visual indication covers or obscures other visual information in the user's view, is also generally a tradeoff between the efficiency of mitigating motion sickness and limiting distraction to the user. Reducing the level of transparency of the occlusion region will generally increase the efficiency of mitigating motion sickness but at the same time increase the distraction of the user since the visual indication used is generally only introduced to orient the user's visual perception in relation to horizontal and vertical direction in relation to real space.

In some embodiments, the visual indication has a higher degree of transparency in a region closest to the occlusion region than in regions further away from the occlusion region. Hence, just outside the occlusion region, the visual indication will be more transparent, or in other words the visual indication will cover or obscure other visual information in the user's view less, than further away from the occlusion region. For example, the degree of transparency can gradually decrease as a function of distance from the occlusion region in a region just outside the occlusion region. This will reduce the distraction of the user in relation to having a sharp edge at the border of the occlusion region, e.g. going from occluded visual indication in the occlusion region to non-transparent visual indication just outside the occlusion region, as sharp edges tend to be more distracting to a user than softer transitions.

Returning to the determining of the approximate gaze convergence distance, it is appreciated that determining calibration data in relation to interpupillary distance between a pupil of a left eye and a pupil of a right eye of a user may be realized by means of retrieval of general approximations or by means of performing measurements or a combination thereof. General approximations may be based on average data for human eyes and may depend on the specific application and/or system in which the method is implemented. Measurements performed may be in relation to the eyes of a specific user.

In embodiments, determining calibration data comprises receiving, from the one or more imaging devices, one or more calibration images of the left eye and the right eye of the user when the user is focusing at a known depth of field, i.e. a known convergence distance, and determining an interpupillary distance between the pupil of the left eye and the pupil of the right eye for the known depth of field based on the one or more calibration images. In such embodiments, the calibration data comprise the known depth of field in combination with interpupillary distance for the known depth of field. Determining the interpupillary distance for a known depth of field for a user will provide calibration data in relation to the specific user which may be used to adapt the method in relation to the specific user. By determining the interpupillary distance for a known depth of field, there will be one interpupillary distance for which the depth of field, i.e. the convergence distance, will be known. This can be used e.g. in applications where a specific convergence distance is of particular interest such that the known depth of field used in calibration is set to the specific convergence distance.

In further embodiments, the gaze convergence function may be defined as a binary function having a first value for interpupillary distances above a threshold value and a second value for interpupillary distances below the threshold value. As each interpupillary distance will correspond to a respective actual convergence distance, the threshold value for the interpupillary distance will correspond to an actual threshold convergence distance. Such embodiments may for example be used when it is sufficient to determine whether the gaze convergence distance is longer or shorter than a threshold convergence distance corresponding to a threshold interpupillary distance. If a current interpupillary distance is determined to be shorter than the threshold, the current convergence distance is determined to be shorter than the threshold convergence distance. Similarly, if a current interpupillary distance is determined to be longer than the threshold, the current convergence distance is determined to be longer than the threshold convergence distance.

If embodiments where the gaze convergence function is defined as a binary function are combined with embodiments where calibration data comprise the known depth of field in combination with interpupillary distance for the known depth of field, the determined interpupillary distance for the known depth of field may be selected as the threshold value. The binary function could then specify whether a current convergence distance is longer than the known depth of filed for a current interpupillary distance being longer than the threshold value and shorter than the known depth of filed for a current interpupillary distance being shorter than the threshold value. The known depth of field may for example be selected in relation to a specific application and/or system in which the method is implemented. For example, the embodiments can be used when one mode of a system should be used when the current convergence distance is longer than a threshold value and a different mode should be used when the current convergence distance is shorter than the threshold value.

In further embodiments the gaze convergence function may be expanded to include further threshold values, such that the gaze convergence function is defined as having a first value for interpupillary distances shorter than a first threshold value and a second value for interpupillary distances longer than the first threshold value but shorter than a second threshold value. The gaze convergence function further has a third value for interpupillary distances longer than the second threshold value. As each interpupillary distance will correspond to a respective actual convergence distance, the first threshold value and the second threshold value for the interpupillary distance will correspond to actual threshold convergence distances. Such embodiments may for example be used when it is sufficient to determine whether the gaze convergence distance is within a convergence distance interval corresponding to a interpupillary distance interval, such as shorter than the first threshold value, longer than the second threshold value, and between the first threshold value and the second threshold value. For example, the embodiments can be used when different modes of a system should be used when the current convergence distance is within different intervals.

In some embodiments, the known depth of field is selected, such that the interpupillary distance can be approximated as the interocular distance. The interpupillary distance can be approximated as the interocular distance when the user is looking at infinity, i.e. the gaze directions of the left and right eye are parallel, or substantially parallel, to each other. The interocular distance is the distance between the rotation center of the eye ball of the eyes, which is generally the same as the distance between the rotation center of the pupils when the gaze directions of the eyes are parallel, i.e. the user is looking at infinity.

In embodiments, the calibration data comprise approximations of eye ball diameter, and a distance from the imaging device to at least one of the eyes. It is enough to have knowledge of the distance from the imaging device to at least one of the eyes to get decent accuracy. However, in order to improve the accuracy instead further, the calibration data may comprise position of rotation center of the eye ball in relation to the imaging device for the left eye and for the right eye instead of a distance from the imaging device to at least one of the eye. In one example, the calibration data also may comprise the interocular distance. Approximations may be determined based on mean values of interocular distance, eye ball diameter, rotation center over a population and on an approximation of the distance from the imaging device to the pupils for the specific eye tracking system in which the method is implemented. Further, an approximate position of rotation center in relation to the imaging device for the left eye and for the right eye can be determined from a size of the iris and the eye ball diameter.

In examples wherein the eye tracking system is an HDM for VR or AR, an angle difference between a vertical direction of the HMD in real space and a vertical direction of the user's visual impressions may be measured over a period of time and the largest angle difference during the period of time may be determined. On condition that the determined largest angle difference is larger than a predetermined threshold value, the size of the occlusion region is decreased.

A vertical direction of the HMD in real space will generally be a vertical direction of the user's head in real space and will be sensed by the vestibular sensors in the inner ear of the user. A vertical direction of the user's visual impression is based on visual cues identified in the user's brain. The visual cues are used to make guesses as to what is believed (interpreted) to be fixed to ground and hence what is vertical and what is horizontal. For example, a large floor (or deck of a boat) would be a good guess or the side of a large building. This is what determines the visual spatial context.

Even though reference is made to vertical direction of the HMD in real space and vertical direction of the user's visual impressions hereinabove, any reference directions (3D vectors) in the two spatial contexts (visual and inner ear context) and relative angular change or directional change over time between the reference directions value could be used together with a predetermined threshold value for determining if further measures for mitigating motion sickness should be applied, such as decreasing the size of the occlusion region.

The size of the occlusion region may generally be a tradeoff between the efficiency of mitigating motion sickness and limiting distraction to the user. For situations where the risk for motion sickness becomes larger, deciding on the tradeoff between reducing motion sickness and limiting distraction for the user may result in a desire to increase the mitigation of motion sickness, e.g. by reducing the size of the occlusion region.

The level of transparency of the visual indication is also generally a tradeoff between the efficiency of mitigating motion sickness and limiting distraction to the user. For situations where the risk for motion sickness becomes larger, deciding on the tradeoff between reducing motion sickness and limiting distraction for the user may result in deciding to increase the mitigation of motion sickness, e.g. by decreasing the transparency of the visual indication.

The risk for motion sickness may for example be higher also if a user is using a HMD for VR where the vertical direction of the user's visual impressions changes much without the vertical direction of the HMD in real space does not change, such that an angle between the vertical direction of the HMD in real space and the vertical direction of the user's visual impressions becomes larger than the predetermined threshold value over a period of time.

Other situations where the risk for motion sickness may be higher can be identified by means of measuring other parameters than the angle between the vertical direction of the HMD in real space and the vertical direction of the user's visual impressions. For such situations threshold values for the measured other parameters are determined and the size of the occlusion region is set in relation to the other parameters.

The visual indication is generally introduced to orient the user's visual perception in relation to horizontal and vertical direction in relation to real space. One way of doing this is if the visual indication indicates a surface which is held horizontal in relation to real space. The surface is superimposed in the user's view. The surface may for example be a grid like pattern.

In addition to being horizontal in relation to real space, i.e. indicating a horizontal direction in relation to real space in the user's view, the visual indication may indicate perspective in relation to a virtual horizon simulating the real space horizon and being horizontal in relation to real space.

The visual indication may also comprise an augmented horizontal line.

In some embodiments of the method for providing an approximate gaze convergence signal, the method may further comprise capturing the one or more images using the one or more imaging devices and further one or more holographic mirrors each having a reflection angle varying across the surface of the holographic mirror, such that with a predefined position in relation to that holographic mirror of a corresponding imaging device of the one or more imaging devices, the magnification of an object represented in the image is constant over distance. By use of a holographic mirror, i.e. holographic reflective area, of this type, the one or more imaging devices become virtual telecentric imaging devices having constant magnification over distance from the holographic mirror towards an object represented in the image. A virtual telecentric imaging device may be implemented in different ways. Common to the different implementations is that a telecentric imaging device will have entrance pupil at infinity and produce images where the magnification of a representation of an object in an image is independent of distance of the object from the telecentric imaging device. In such embodiments, the method will not be sensitive to translations of the user's eyes in relation to the imaging devices.

In further embodiments the calibration data comprise approximation of eye ball diameter. In one example, the calibration data also comprise an approximation of the interocular distance. In another example, the interocular distance of the user is measured, as the interpupillary distance for the known depth of field, being close to infinity, i.e. gaze directions from the left and right eye are substantially parallel. For example, combined with embodiments where the one or more imaging devices together with the holographic mirror 510 functions as virtual telecentric imaging devices, approximations of interocular distance and eye ball diameter would be sufficient as calibration data as the magnification in an image produced by a virtual telecentric imaging device is independent of distance of the user's eyes to the virtual telecentric imaging device.

In embodiments, determining calibration data comprises receiving, from the one or more imaging devices, one or more first calibration images of the left eye and the right eye of a user when the user is focusing at a first known depth of field, i.e. a first known convergence distance, determining a first interpupillary distance between the pupil of the left eye and the pupil of the right eye based on the one or more first calibration images, receiving, from the one or more imaging devices, one or more second calibration images of the left eye and the right eye of the user when the user is focusing at a second known depth of field, i.e. a second known convergence distance, and determining a second interpupillary distance between the pupil of the left eye and the pupil of the right eye based on the one or more second calibration images. In such embodiments, the calibration data comprise the first known depth of field in combination with the first interpupillary distance and the second known depth of field in combination with the second interpupillary distance.

In further embodiments, the gaze convergence function is defined to be linear within an interval of interpupillary distances. Approximating the gaze convergence to be linear function of the interpupillary distance may be useful within certain intervals of interpupillary distances. Although the relationship between interpupillary distance and convergence distance is generally not linear over the entire range of interpupillary distances corresponding to near zero to infinity of convergence distances, linear approximations may be useful in more limited intervals at least for certain applications and/or systems in which the method is implemented.

If embodiments where the gaze convergence function is defined to as linear within an interval of interpupillary distances are combined with embodiments where calibration data comprise the first known depth of field in combination with the first interpupillary distance and the second known depth of field in combination with the second interpupillary distance, the interval of interpupillary distances is between the first interpupillary distance for the first known depth of field and the second interpupillary distance for the second known depth of field, and a value of the gaze convergence function for the first interpupillary distance is set to the first known depth of field and a value of the gaze convergence function for the second interpupillary distance is set to the second known depth of field. The first known depth of field and second known depth of field may for example be selected in relation to a specific application and/or system in which the method is implemented.

In embodiments, determining a current interpupillary distance comprises receiving, from the one or more imaging devices, one or more current images of the left eye and the right eye of the user when the user is focusing at a current depth of field, and determining a current interpupillary distance between the pupil of the left eye and the pupil of the right eye for the current depth of field based on the one or more current images.

In embodiments, the method is performed in a head mounted eye tracking system.

According to a second aspect, there is provided an eye tracking system comprising circuitry configured to perform the method of the first aspect. Said eye tracking system may be using a head mounted display (HMD) for VR or AR comprising an apparatus for mitigating motion sickness as previously discussed. The apparatus may comprise a receiver for receiving data from a sensor indicating a current orientation of the HMD in real space. The apparatus may further comprise processing circuitry for superimposing a visual indication on a display of the HMD. The visual indication provides visual information to a user of the current orientation of the HMD in real space.

In some embodiments, the receiver is further for receiving data from a gaze tracking function indicating current gaze point of the user. Furthermore, the visual indication comprises an occlusion region including the current gaze point of the user, such that the visual indication is not disclosed in the occlusion region.

Embodiments of the eye tracking system according to the second aspect may for example include features corresponding to the features of any of the embodiments of the method according to the first aspect.

In embodiments the eye tracking system is a head mounted system.

According to a third aspect, there is provided one or more computer-readable storage media storing computer-executable instructions that, when executed by an apparatus, cause the apparatus to perform the method of the first aspect.

Embodiments of the one or more computer-readable storage media according to the third aspect may for example include features corresponding to the features of any of the embodiments of the method according to the first aspect.

The one or more computer-readable media of the third aspect may for example be one or more non-transitory computer-readable media.

According to a fourth aspect, there is provided a method for gaze based virtual reality (VR) menu expansion. In the method a menu is provided in VR such that only a portion of the menu is visible outside a center region of a user's view. The portion of the menu is fixed in VR space in relation to the user's head. On condition that the user's gaze is directed to the portion of the menu, the menu is made fixed (pinned) in relation to real space such that when the users head is moved in a direction of previously not visible portions of the menu, such previously not visible portions of the menu will become visible.

When the complete menu is visible, the complete menu may be made fixed (pinned) in relation to the user's head. On condition that the user's gaze is directed away from the menu, the view returns to only a portion of the menu being visible outside the center region of a user's view.

According to a fifth aspect, there is provided an apparatus comprising circuitry configured to perform the method of the fourth aspect.

Embodiments of the apparatus according to the fifth aspect may for example include features corresponding to the features of any of the variations of the method according to the fourth aspect.

According to a sixth aspect, there is provided one or more computer-readable storage media storing computer-executable instructions that, when executed by an apparatus, cause the apparatus to perform the method according to the fourth aspect.

Embodiments of the one or more computer-readable storage media according to the sixth aspect may for example include features corresponding to the features of any of the embodiments according to the fourth aspect.

The one or more computer-readable media of the sixth aspect may for example be one or more non-transitory computer-readable media.

According to a seventh aspect, there is provided a method of gaze based augmented reality (AR) menu expansion. In the method, a menu is provided in AR such that only a portion of the menu is visible outside a center region of a user's view. The portion of the menu is fixed in a virtual space in relation to the user's head. On condition that the user's gaze is directed to the portion of the menu, the menu is made fixed (pinned) in the virtual space in relation to real space such that when the users head is moved in a direction of previously not visible portions of the menu, such previously not visible portions of the menu will become visible.

When the complete menu is visible, the complete menu may be made fixed in relation to the user's head. The menu may then be fixed in relation to the user's head as long as the user's gaze is directed to the menu. On condition that the user's gaze is directed away from the menu, the view returns to only a portion of the menu being visible outside the center region of a user's view.

According to an eighth aspect, there is provided an apparatus comprising circuitry configured to perform the method according to the seventh aspect.

Embodiments of the apparatus according to the eighth aspect may for example include features corresponding to the features of any of the embodiments of the method according to the seventh aspect.

According to a ninth aspect, there is provided one or more computer-readable storage media storing computer-executable instructions that, when executed by an apparatus, cause the apparatus to perform the method of the seventh aspect.

Embodiments of the one or more computer-readable storage media according to the ninth aspect may for example include features corresponding to the features of any of the embodiments of the method according to the seventh aspect.

The one or more computer-readable media of the ninth aspect may for example be one or more non-transitory computer-readable media.

BRIEF DESCRIPTION OF THE DRAWINGS

These and other aspects will now be described in the following illustrative and non-limiting detailed description, with reference to the appended drawings.

All the figures are schematic, not necessarily to scale, and generally only show parts which are necessary in order to elucidate the respective example, whereas other parts may be omitted or merely suggested.

DETAILED DESCRIPTION

Figure 1:
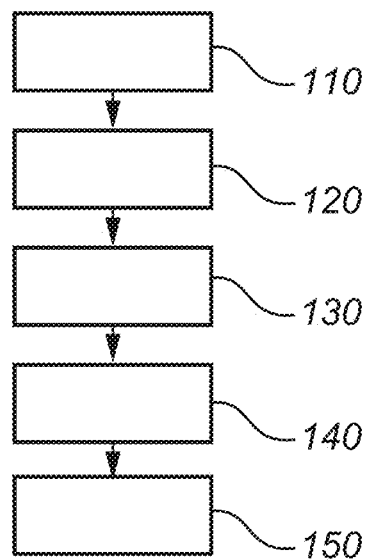
FIG. 1 is a flow chart of a method for determining a gaze convergence distance.

FIG. 1 is a flow chart of a method for determining a gaze convergence distance in an eye tracking system. The gaze convergence distance describes a distance from a point in relation to a user's eyes to a point where the user is currently focusing. The point in relation to the user's eyes could for example be a point halfway between the rotation centers of the user's eyes. First calibration data are determined 110 in relation to interpupillary distance between a pupil of a left eye and a pupil of a right eye of a user. Calibration data refer to data for calibrating a method to a specific user, a specific eye tracking system and/or other varying factors. For example, interpupillary distance for users focusing at a specific depth of field differs between users due to differing anatomy of the users. Furthermore, depending on the type of system and other factors, the length between a user's eyes and imaging devices used to capture images used in the method will differ. The calibration data required will generally differ depending on the gaze convergence function used. Determining calibration data may be realized by means of retrieval of general approximations or by means of performing measurements or a combination thereof. General approximations may be based on average data for human eyes and may depend on the specific application and/or system in which the method is implemented. Measurements performed may be in relation to the eyes of a specific user. Based on the determined calibration data, a gaze convergence function providing an approximate gaze convergence distance of the user based on a determined interpupillary distance of the user is determined 120. The gaze convergence function will generally differ between different application, e.g. due to different need for the accuracy needed for the approximation of the convergence distance and/or what the approximate gaze convergence distance should be used for. To determine a current interpupillary distance, one or more images of the left eye and the right eye of the user are then received 130 from one or more imaging devices and the current interpupillary distance of the user is determined 140 based on the one or more images. A current approximate gaze convergence distance is then determined 150 based on the current interpupillary distance and the gaze convergence function.

Examples of applications of determining of gaze convergence distance are in virtual reality and augmented reality systems as well as prescription glasses with automatic adjustment for convergence distance, autofocus for glasses etc.

Figure 2:
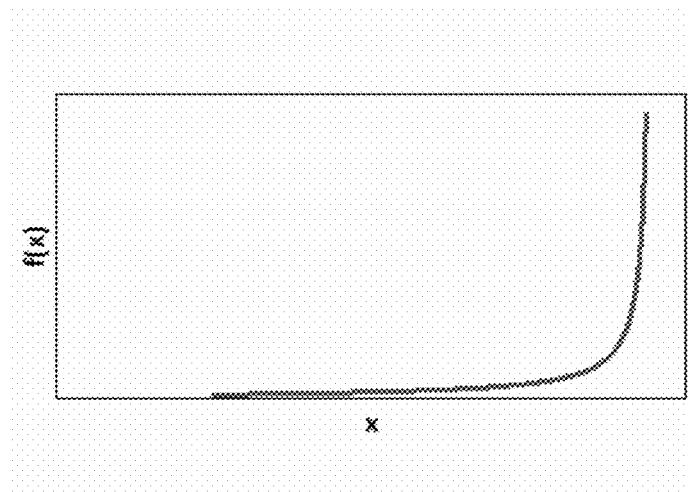
FIG. 2 is a diagram showing a first example of a gaze convergence function for providing an approximate gaze convergence distance based on interpupillary distance.

FIG. 2 is a diagram shows an example of a gaze convergence function f(x) providing an approximation of a gaze convergence distance based on interpupillary distance x. If the eyes of a user are approximated with spheres with radius r and a shortest distance between the spheres $x_0$ and distance between rotation centers of the spheres $x_\infty$, and the pupils approximated to be at the surfaces of the spheres and to point in direction towards each other when gaze convergence distance is 0 and parallel to each other when the convergence distance is ∞ then the distance between the pupils at convergence distance 0 is $x_0$ and distance between the pupils at convergence distance ∞ is $x_\infty$. In this case the convergence distance is measured from a point halfway between the rotation centers of the eye balls. Furthermore, it can be derived that $x_\infty = x_0 + 2r$. A function f(x) approximating the convergence distance for distances x between pupils (interpupillary distance) can be derived for $x_0 \leq x \leq x_\infty$ using the approximated geometry. The approximate function is $$f(x) = \frac{\sqrt{r(x-x_0) - \left(\frac{x-x_0}{2}\right)^2}}{\left(1 - \frac{x}{x_0 + 2r}\right)}$$

The function relates to the case where the user is focusing at a point along a line starting from a point halfway between the rotation centers and being perpendicular to a line between the rotation centers. This assumption is reasonable in many cases as a user focusing a certain object will normally turn her/his head to achieve such a situation.

Interocular distance, i.e. the distance between the rotation center of the eye balls, is the same as $x_\infty$. hence, if calibration data are provided in the form of interocular distance, the eye ball radius r, and positions of rotation centers in relation to imaging devices of an eye tracking system, the function f(x) can be used to determine a current approximate convergence distance for a determined current interpupillary distance. The current interpupillary distance is determined from images of the eyes and use of any known method for identification of pupils in the images.

Figure 3:
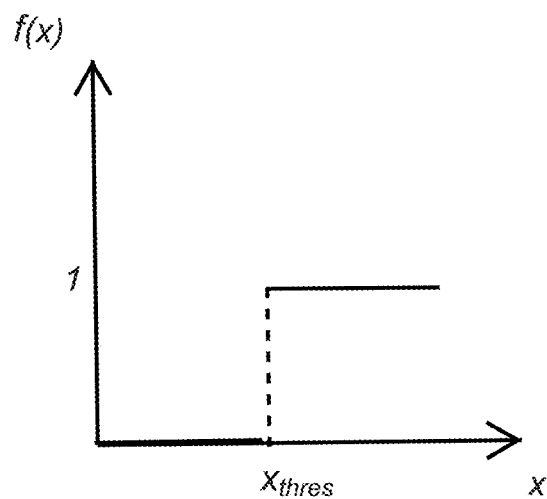
FIG. 3 is a diagram showing a second example of a gaze convergence function for providing an approximate gaze convergence distance based on interpupillary distance.

FIG. 3 is a diagram showing a second example of a gaze convergence function for providing an approximate gaze convergence distance based on interpupillary distance. The gaze convergence function is defined as a binary function having a first value (e.g. 0) for interpupillary distances shorter than a threshold value $x_{thres}$ and a second value (e.g. 1) for interpupillary distances longer than the threshold value $x_{thres}$. As each interpupillary distance will correspond to a respective actual convergence distance, the threshold value for the interpupillary distance will correspond to an actual threshold convergence distance. Such a binary gaze convergence function could be used for example be used in applications where is sufficient to determine whether the gaze convergence distance is longer or shorter than a threshold convergence distance corresponding to a threshold interpupillary distance.

To calibrate such a binary gaze convergence function to a user, calibration data can be determined in the form of a measured interpupillary distance for a known depth of field. This may for example be achieved by instructing the user to focus at an object at the known depth of field. The determined interpupillary distance for the known depth of field may then be selected as the threshold value. The binary function could then indicate whether a current convergence distance is longer than the known depth of filed for a current interpupillary distance being longer than the threshold value and shorter than the known depth of filed for a current interpupillary distance being shorter than the threshold value. The known depth of field may for example be selected in relation to a specific application and/or system in which the method is implemented. For example, such a binary function could be used in a system having two displays at two different distances.

The gaze convergence function depicted in FIG. 3 may be expanded to include further threshold values, such that the gaze convergence function is defined as having a first value for interpupillary distances shorter than a first threshold value and a second value for interpupillary distances longer than the first threshold value but shorter than a second threshold value. The gaze convergence function further has a third value for interpupillary distances longer than the second threshold value. As each interpupillary distance will correspond to a respective actual convergence distance, the first threshold value and the second threshold value for the interpupillary distance will correspond to actual threshold convergence distances. Such embodiments may for example be used when it is sufficient to determine whether the gaze convergence distance is within a convergence distance interval corresponding to a interpupillary distance interval, such as shorter than the first threshold value, longer than the second threshold value, and between the first threshold value and the second threshold value.

To calibrate such a gaze convergence function expanded to further threshold values to a user, calibration data can be determined in the form of a first measured interpupillary distance for a first known depth of field and a second measured interpupillary distance for a second known depth of field. This may for example be achieved by instructing the user to focus at an object at the first known depth of field and capturing first images of the user's eyes. The user is then instructed to focus at an object at the second known depth of field, which is longer than the first depth of field, and second images are captured of the user's eyes. A determined first interpupillary distance for the first known depth of field may then be determined from the first images and selected as a first threshold value. A determined second interpupillary distance for the second known depth of field may then be determined from the second images and selected as a second threshold value. The function could then specify whether a current convergence distance is shorter than the first known depth of filed for a current interpupillary distance being shorter than the first threshold value. The function further specifies that a current convergence distance is longer than the first known depth of field but shorter than the second known depth of field for a current interpupillary distance being longer than the first threshold value but shorter than the second threshold value. Finally, the function specifies that a current convergence distance is longer than the second known depth of field for a current interpupillary distance being longer than the second threshold value. The known depth of field may for example be selected in relation to a specific application and/or system in which the method is implemented. For example, such a binary function could be used in a system having two displays at two different distances.

Figure 4:
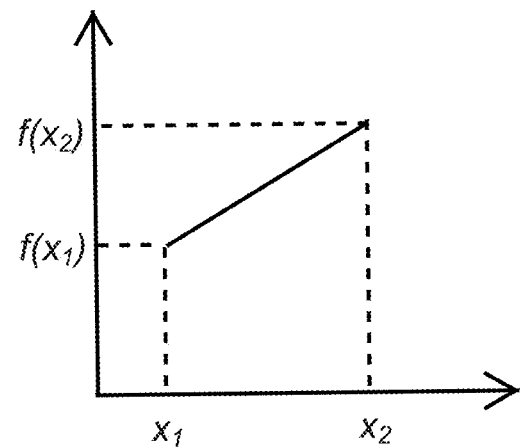
FIG. 4 is a diagram showing a third example of a gaze convergence function for providing an approximate gaze convergence distance based on interpupillary distance.

FIG. 4 is a diagram showing a third example of a gaze convergence function for providing an approximate gaze convergence distance based on interpupillary distance e.g. in a virtual reality (VR) system or an augmented reality AR system including an eye/gaze tracking function. A first interpupillary distance $x_1$ is determined when a user focuses on a first known depth of field $y_1$. A second interpupillary distance $x_2$ is determined when a user focuses on a second known depth of field $y_2$, where the second known depth of field $y_2$ is longer than the first depth of field $y_1$. The depth of field is then approximated as a linear function in the interval $x_1<x<x_2$ starting from the point $(x_1, y_1)$ and ending in the point $(x_2, y_2)$.

The gaze convergence function depicted in FIG. 4 may be expanded to include further known depth of field. A third interpupillary distance $x_3$ is determined when the user focuses on a third known depth of field $y_3$, where the third depth of field $y_3$ is longer than the second depth of field $y_2$. The depth of field is then approximated as a linear function in the interval $x_2<x<x_3$ starting from the point $(x_2, y_2)$ and ending in the point $(x_3, y_3)$.

Figure 5:
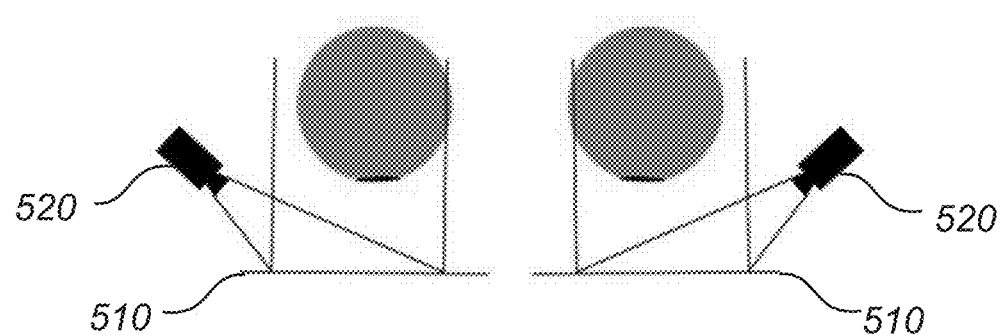
FIG. 5 is a schematic diagram showing an example of a setup using virtual telecentric imaging devices for determining interpupillary distance.

FIG. 5 is a schematic diagram showing an example of a setup using virtual telecentric imaging devices for determining interpupillary distance. For non-telecentric imaging devices, the magnification of representations of an object will vary depending on the distance of the object from the imaging device. For virtual telecentric imaging devices the magnification is constant. Hence, determining of interpupillary distance can be made from images from telecentric imaging devices without the need to know or determine the distance between the eyes and the imaging devices. In the setup schematically depicted in FIG. 5, virtual telecentric imaging devices are provided by means of imaging devices 520 and holographic mirrors 510. Each virtual telecentric device comprises an imaging device 520 and a holographic mirror 510. The holographic mirror 510 is mainly transparent for visible light. In one example, holographic mirror 510 is arranged to reflect infrared light. The holographic mirror 510 may comprise a reflective surface, such as a reflective film, attached to or incorporated in a lens. In another example, the holographic mirror 510 may be of attached directly to the frame of a head mounted system, such as a head-mounted display or eye glasses. The holographic mirror 510 is such that the reflection angle varies across the surface of the holographic mirror 510 such that infrared light (or the type of light used for capturing images) perpendicular to the surface of the holographic mirror 510 will be reflected towards a corresponding imaging device 520. Using virtual telecentric imaging devices of any implementation will omit the need for calibration in relation to the distance between a user's eyes and the imaging device before determining interpupillary distance.

In alternative to using virtual telecentric imaging devices, a setup where the distance from the imaging devices to the eyes is known can be used. For example, head mounted systems, such as head mounted virtual reality and augmented reality systems, will generally be arranged such that the distance is the same or similar for different users. In alternative, the distance can be calibrated for a specific user and then will remain approximately the same throughout use for that user. Further, the distance can be calibrated from a size of a representation of the iris in an image.

Methods of calculating gaze convergence distance in an eye tracking system as disclosed herein may be implemented in an apparatus comprising circuitry configured to perform the method and/or in software, e.g. stored on one or more computer-readable storage media, including computer-executable instructions that, when executed by an apparatus, cause the apparatus to perform the method. The one or more computer-readable media of the seventh aspect may for example be one or more non-transitory computer-readable media.

Figure 6:
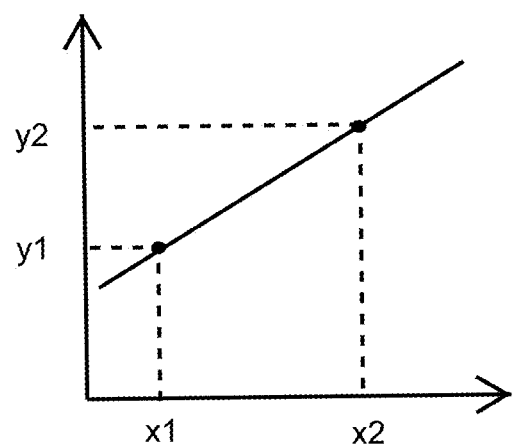
FIG. 6 is a diagram showing an example of a function for determining a gaze convergence distance based on pupillary distance.

FIG. 6 is a diagram showing an example of a function for determining a gaze convergence distance based on interpupillary distance in a virtual reality (VR) system or an augmented reality AR system including an eye/gaze tracking function. A first interpupillary distance x1 is determined when a user focuses on a first known depth of field y1, where the first known depth of field y1 is preferably short. A second interpupillary distance x2 is determined when a user focuses on a second known depth of field y2, where the second known depth of field y2 is preferably long. The difference between the second depth of field y2 and the first depth of field y1 is preferably large. The depth of field is then approximated as a linear function through the points (x1, y1) and (x2, y2).

Figure 7:
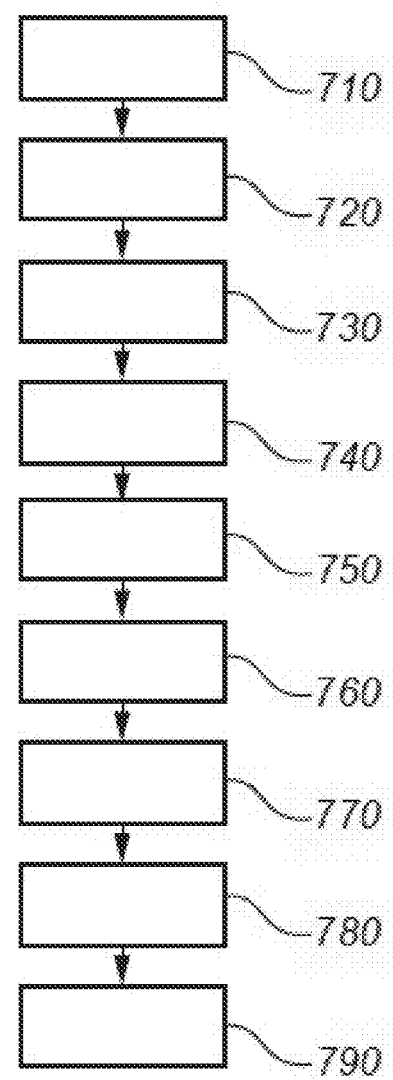
FIG. 7 is another example of flow chart of the method for determining a gaze convergence distance

FIG. 7 is another example of a flow chart of the method for determining a gaze convergence distance in a virtual reality (VR) system or an augmented reality AR system. A first image is received 710 of a left eye and a right eye of a user when the user is focusing at a first known depth of field. A pupil of the left eye and a pupil of the right eye are identified 720 in the first image and a pupil position of the left eye and a pupil position of the right eye are determined 730 in the first image. A first interpupillary distance in the first image between the pupil position of the left eye in the first image and the pupil position of the right eye in the first image is calculated 740. A second image is received 750 of the left eye and the right eye of the user when the user is focusing at a second known depth of field. The pupil of the left eye and the pupil of the right eye are identified 760 in the second image and a pupil position of the left eye and the pupil position of the right eye are determined 770 in the second image. A second interpupillary distance in the second image between the pupil position of the left eye in the second image and the pupil position of the right eye in the second image is calculated 780. The depth of field, i.e. the gaze convergence distance, is defined 790 as a linear function of the interpupillary distance based on the first depth of field and first interpupillary distance together with the second depth of field and the second interpupillary distance.

After defining the gaze convergence distance as a linear function of the interpupillary distance, a gaze convergence distance can be determined from a received third image of the left eye and the right eye of the user when the user is focusing at a third unknown depth of field by identifying the pupil of the left eye in the third image and the pupil of the right eye are in the third image and determining a pupil position of the left eye in the third image and the pupil position of the right eye in the first image. An interpupillary distance in the third image between the pupil position of the left eye in the third image and the pupil position of the right eye in the third image is then calculated and the gaze convergence distance is determined from the defined linear function.

Methods of calculating gaze convergence distance in an eye tracking system as disclosed herein may be implemented in an apparatus comprising circuitry configured to perform the method and/or in software, e.g. stored on one or more computer-readable storage media, including computer-executable instructions that, when executed by an apparatus, cause the apparatus to perform the method. The one or more computer-readable media may for example be one or more non-transitory computer-readable media.

Figure 8A:
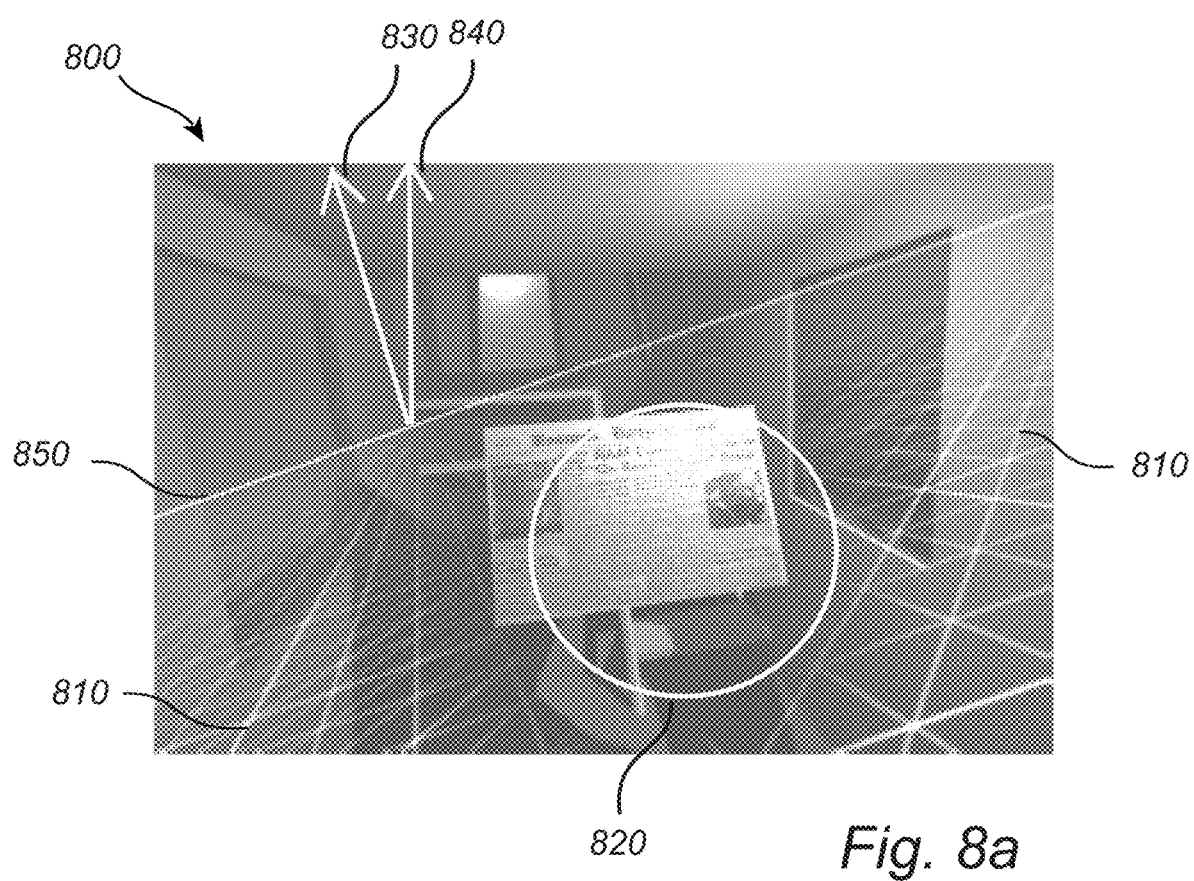
FIG. 8a shows a schematic view of an example of visual indication in a VR view.

FIG. 8 shows a schematic view of an example of visual indication in a virtual reality (VR) view 800 in a system using a head mounted display (HMD) including an eye/gaze tracking function. In the VR view 800 a visual indication comprising a grid 810 has been superimposed over the VR view 800. The eye/gaze tracking function provides information regarding a current gaze point of the user of the HMD. An occlusion region 820 indicated by a circle 820 is provided in the VR view 800. Within the occlusion region 820 the grid 810 is completely transparent and just outside the occlusion region, the transparency of the grid 810 is gradually reduced. The circle 820 is generally not shown in the view in the HMD but is included in the VR view 800 in FIG. 1 for illustrative purposes. A sensor (not shown) provides information regarding the orientation of the HMD in real space, e.g. an angle in relation to a horizontal direction of real space indicated in the image as an arrow 830. The sensor may for example be a gyro and/or accelerometer. In addition to the arrow 830 indicating horizontal direction of real space, an arrow 840 is shown indicating horizontal direction as experienced visually by a user of the HMD. The arrows 830, 840 are generally not shown in the view in the HMD but are included in the VR view 800 of FIG. 8a for illustrative purposes. In addition to the grid 810, the visual indication comprises an augmented horizontal line 850.

The grid 810 and the augmented horizontal line 850 provide visual information to a user of the current orientation of the HMD in real space by generally indicating a surface which is horizontal in relation to real space.

It is to be noted that it is indicated that the grid 810 is transparent in different degrees outside the occlusion region 820. This is intended to mean that the lines of the grid itself are transparent. The grid in itself is in another aspect transparent in relation to the background since it is comprised of grid lines and together indicating a surface and between the grid lines the VR view is visible without being covered to any extent of the grid.

It is further also to be noted that the transparency of the grid lines is further made more transparent closer to the augmented horizontal line 850. This is a different feature than the transparency of the grid lines just outside the occlusion region.

Real world motion sickness generally occurs when a person's eyes are providing conflicting signals regarding motion and orientation from the signals provided by vestibular sensors in the inner ear. In real life, for example keeping an eye on the horizon while traveling on a boat or looking at the road ahead while riding in a car are proven methods of relieving motion sickness symptoms.

In AR and VR usage, finding such 'horizon' may not be feasible in every scene. The grid 810 and the augmented horizontal line 850 are included in order to mitigate VR/AR user's motion sickness.

The occlusion region 820 can be introduced around a current gaze point to avoid the visual indication obscuring what the user is currently looking at. The occlusion region preferably at least substantially matches the fovea part of the retina of the user's eye which is the portion of the retina that provides the clearest vision. The occlusion region 820 is shown as circular in the view 800 of FIG. 1*a* but may have other shapes such as rectangular, oval etc.

The size of the occlusion region is generally a tradeoff between the efficiency of mitigating motion sickness and limiting distraction to the user. Reducing the size of the occlusion region will generally increase the efficiency of mitigating motion sickness and at the same time increase the distraction of the user since the visual indication used is generally introduced to orient the user's visual perception in relation to horizontal and vertical direction in relation to real space.

Furthermore, the level of transparency (opacity) of the visual indication, or in other words how much the visual indication covers or obscures other visual information in the user's view, is also generally a tradeoff between the efficiency of mitigating motion sickness and limiting distraction to the user. Reducing the level of transparency of the occlusion region will generally increase the efficiency of mitigating motion sickness and at the same time increase the distraction of the user since the visual indication used is generally only introduced to orient the user's visual perception in relation to horizontal and vertical direction in relation to real space.

Having a higher degree of transparency in a region closest outside the occlusion region than in regions further away from the occlusion region and gradually decrease as a function of distance from the occlusion region in a region just outside the occlusion region will reduce the distraction of the user in relation to an example with a sharp edge in terms of degree of transparency at the border of the occlusion region as sharp edges tend to be more distracting to a user than softer transitions.

The angle difference between the vertical direction of the HMD in real space indicated by arrow 830 and a vertical direction of the user's visual impressions indicated by arrow 840 is measured over a period of time and the largest angle difference during the period of time is determined. If the determined largest angle difference is larger than a predetermined threshold value, the size of the occlusion region is decreased.

In alternative to measuring only the largest angle difference during a period of time the size of the change of the angle difference may be measured and a largest angle change over a period of time may be determined. If the determined largest angle difference change is larger than a predetermined threshold value, the size of the occlusion region is decreased.

As indicated, the size of the occlusion region is generally a tradeoff between the efficiency of mitigating motion sickness and limiting distraction to the user. For situations where the risk for motion sickness becomes larger, deciding on the tradeoff between reducing motion sickness and limiting distraction for the user may result in a desire to increase the mitigation of motion sickness, e.g. by reducing the size of the occlusion region.

The risk for motion sickness may for example be higher if a user is using a HMD on a boat and the boat is rocking much, e.g. such that an angle (or a change of the angle) between the vertical direction of the HMD in real space and the vertical direction of the user's visual impressions becomes larger than the predetermined threshold value over a period of time. In such cases the size of the occlusion region may be reduced. In alternative or in addition to reducing the size of the occlusion region, the transparency of the visual indication can be reduced.

The risk for motion sickness may for example be higher also if a user is using a HMD for VR where the vertical direction of the user's visual impressions changes much without the vertical direction of the HMD in real space does not change, such that an angle between the vertical direction of the HMD in real space and the vertical direction of the user's visual impressions becomes larger than the predetermined threshold value over a period of time.

Other situations where the risk for motion sickness may be higher can be identified by means of measuring other parameters than the angle between the vertical direction of the HMD in real space and the vertical direction of the user's visual impressions. For such situations threshold values for the measured other parameters are determined and the size of the occlusion region is set in relation to the other parameters.

The visual indication is generally introduced to orient the user's visual perception in relation to horizontal and vertical direction in relation to real space. One way of doing this is if the visual indication comprises something that indicates a surface which is horizontal in relation to real space. The surface is superimposed in the user's view.

In addition to being horizontal in relation to real space, i.e. indicating a horizontal direction in relation to real space in the user's view, the visual indication may indicate perspective in relation to a virtual horizon simulating the real space horizon and being horizontal in relation to real space.

The visual indication may for example comprise a grid like pattern 810 and an augmented horizontal line. Generally, the more non-repetitive and high contrasting an indicated surface comprised in the visual indication is, the better. One pattern effective for mitigating motion sickness would for example be a newspaper print. However, it comes at the cost of being distracting.

FIG. 8 shows a view of a VR HMD system. However, the description hereinabove in relation to VR is equally applicable for AR HMD systems. For example, if a AR HMD system is used inside a vehicle such as a train, car or boat where the user cannot easily see out of the vehicle and hence not see a horizon etc., a visual indication can be superimposed on a display of the AR HMD over the other virtual objects and real life view of the user as is disclosed in relation VR hereinabove.

Figure 8B:
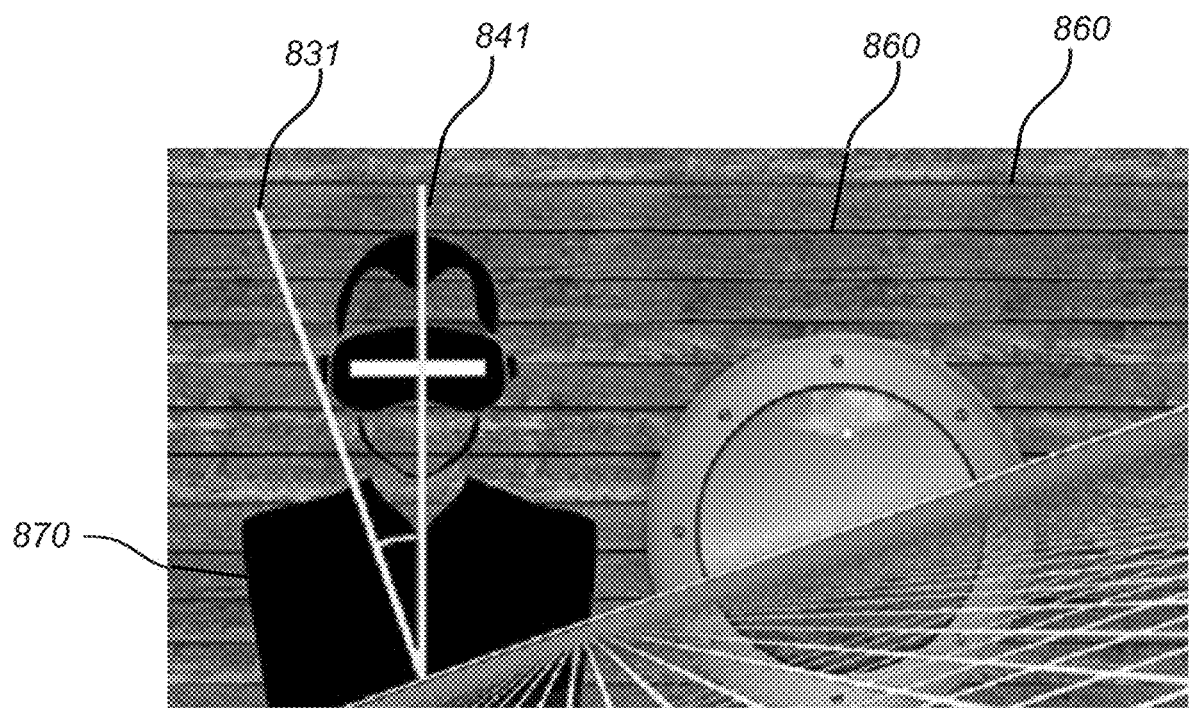
FIGS. 8b and 8c show schematic views of examples of a difference in angle between a vertical direction of a HMD (user's head) in real space and a vertical direction of a user's visual impressions.
Figure 8C:
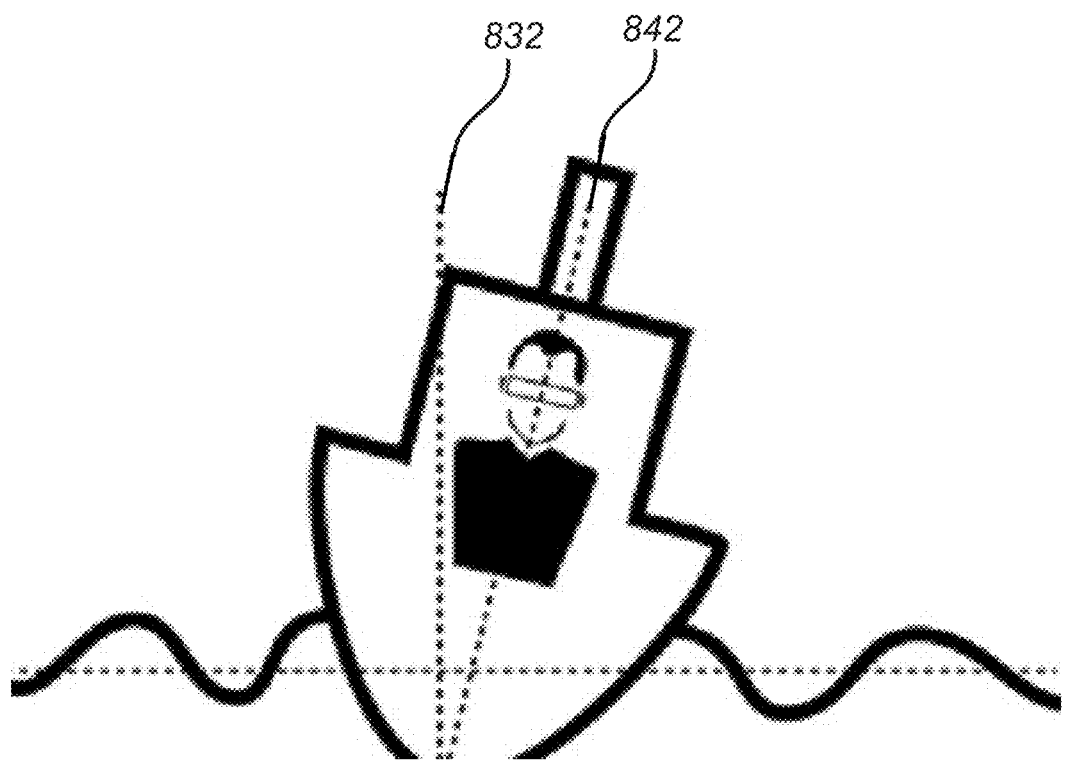

FIG. 8b and FIG. 8c show schematic views of examples of a difference in angle between a vertical direction 831 of a HMD (user's head) in real space and a vertical direction 841 of a user's visual impressions.

A vertical direction of the HMD in real space will generally be a vertical direction of the user's head in real space and will be sensed by the vestibular sensors in the inner ear of the user. A vertical direction of the user's visual impression is based on visual cues identified in the user's brain. The visual cues are used to make interpretations as to what is vertical and what is horizontal. For example, the parallel lines 860 on the wall behind the user 870 in FIG. 1b could be interpreted as being horizontal according to the user's visual impressions. Other examples are a large floor (or deck of a boat) or the side of a large building. This is what determines the visual spatial context.

Even though reference is made to vertical direction of the HMD in real space and vertical direction of the user's visual impressions hereinabove, any reference directions (3D vectors) in the two spatial contexts (visual and inner ear context) and relative angular change or directional change over time between the reference directions value could be used together with a predetermined threshold value for determining if further measures for mitigating motion sickness should be applied, such as decreasing the size of the occlusion region.

Figure 9:
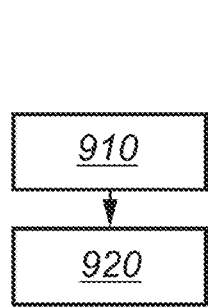
FIG. 9 is a flow chart of a method for mitigating motion sickness.

FIG. 9 is a flow chart of a method for mitigating motion sickness in a system using a head mounted display (HMD). In the method data are received 910 from a sensor indicating a current orientation of the HMD in real space. A visual indication is then superimposed 920 on a display of the HMD, which visual indication provides visual information to a user of the current orientation of the HMD in real space.

The method may further comprise receiving data from a gaze tracking function indicating current gaze position of the user. The visual indication may then comprise an occlusion region including the current gaze position of the user such that the visual indication is not disclosed in the occlusion region.

The visual indication may have a higher degree of transparency in a region closest to the occlusion region than in regions further away from the occlusion region.

The method may further comprise measuring an angle difference between a vertical direction of the HMD in real space and a vertical direction of the user's visual impressions is measured over a period of time and the largest angle difference during the period of time is determined. If the determined largest angle difference is larger than a predetermined threshold value, the size of the occlusion region is decreased.

Figure 10:
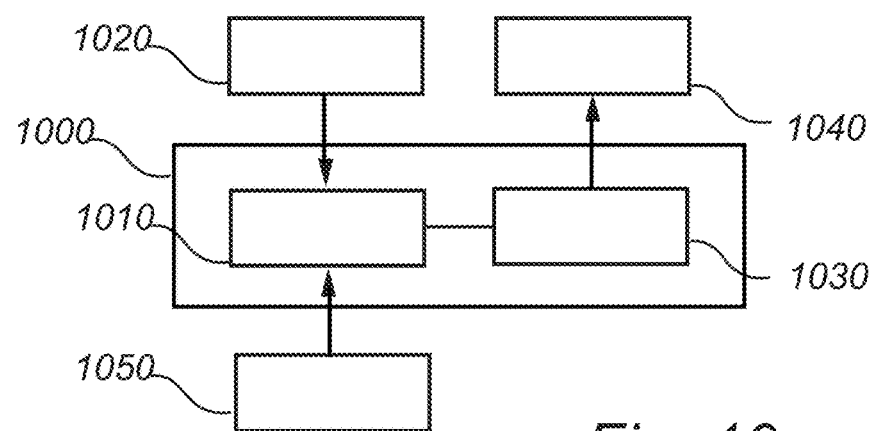
FIG. 10 is a schematic diagram of an apparatus for mitigating motion sickness.

FIG. 10 is a schematic diagram of an apparatus 1000 for mitigating motion sickness in a system using a head mounted display (HMD) for VR or AR. The apparatus 1000 comprises a receiver 1010 for receiving data from a sensor 1030 indicating a current orientation of the HMD in real space. The apparatus 1000 further comprises processing circuitry 1030 for superimposing a visual indication on a display 1040 of the HMD. The visual indication provides visual information to a user of the current orientation of the HMD in real space.

The receiver further receives data from a gaze tracking circuitry 1050 indicating current gaze position of the user. The visual indication may then comprise an occlusion region including the current gaze position of the user, such that the visual indication is transparent to a higher degree in the occlusion region than in other regions of the view outside the occlusion region.

Methods for mitigating motion sickness in a system using a head mounted display (HMD) as disclosed herein may be implemented in an apparatus comprising circuitry configured to perform the method and/or in software, e.g. stored on one or more computer-readable storage media, including computer-executable instructions that, when executed by an apparatus, cause the apparatus to perform the method. The one or more computer-readable media aspect may for example be one or more non-transitory computer-readable media.

Figure 11:
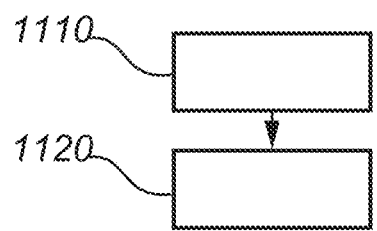
FIG. 11 is a flow chart of a method for gaze based menu expansion.

FIG. 11 is a flow chart of a method for gaze based virtual reality (VR) menu expansion in a VR system including an eye/gaze tracking function. A menu is provided 1110 in VR such that only a portion of the menu is visible outside a center region of a user's view when the user's eyes are directed straight ahead, i.e. not up, down, to the right or to the left. The portion of the menu is fixed in VR space in relation to the user's head. If the user's gaze is directed to the portion of the menu, by directing the eyes towards the portion of the menu, the menu is made fixed (pinned) 1120 in relation to real space such that when the users head is moved in a direction of previously not visible portions of the menu, such previously not visible portions of the menu will become visible.

The method may further include that when the complete menu is visible, the complete menu is made fixed again in VR space in relation to the user's head as long as the user's gaze is directed to the menu. On condition that the user's gaze is directed away from the menu, the view returns to only a portion of the menu being visible outside the center region of a user's view and fixed in VR space in relation to the user's head.

FIGS. 12a-d show schematic views of an example of gaze based menu expansion in a VR system including an eye/gaze tracking function.

Figure 12A:
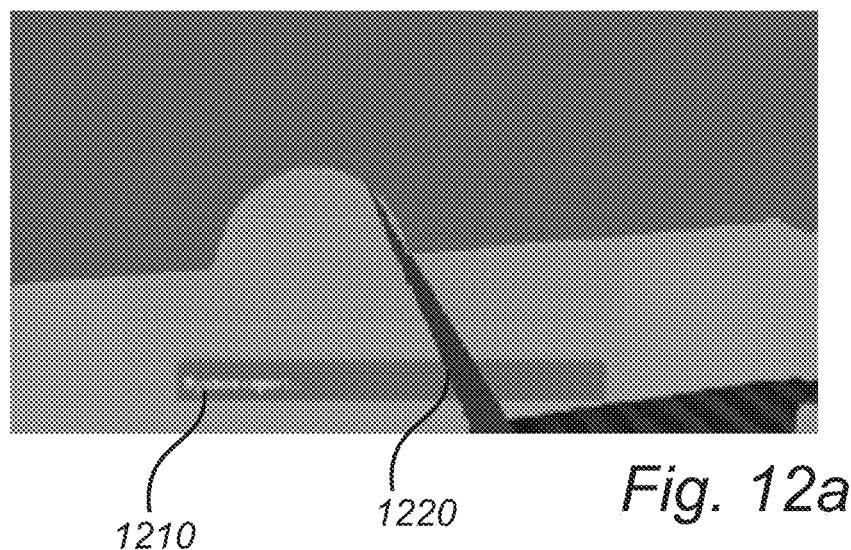
FIG. 12a-d show schematic views of an example of gaze based menu expansion.

In FIG. 12a, a menu 1210 is provided in VR such that only a portion of the menu 1210 is visible below a center region of a user's view when the user's eyes are directed straight ahead, i.e. not up, down, to the right or to the left. The portion of the menu 1210 is fixed in VR space in relation to the user's head, i.e. the portion of the menu 1210 will be positioned at the bottom of the view of the user in VR regardless of how the user's head is turned. The users gaze direction is indicated by the pointer 1220 in FIG. 7a.

Figure 12B:
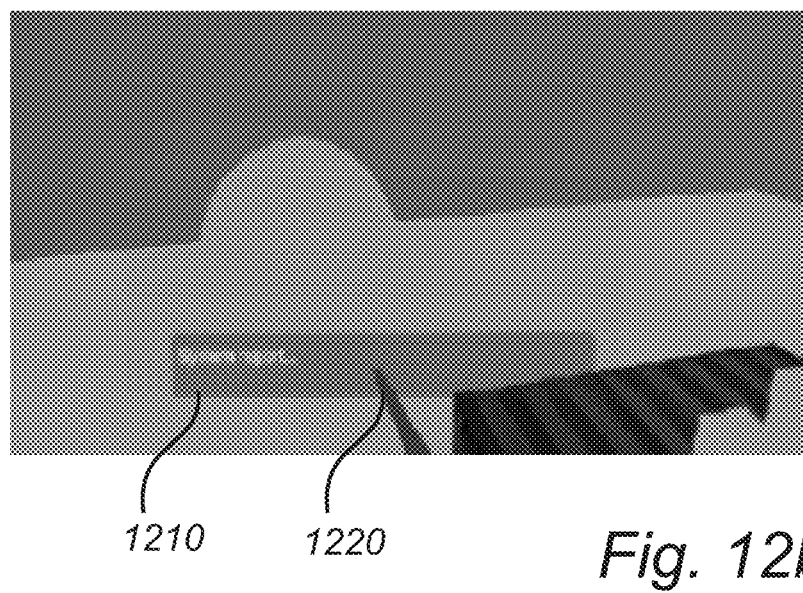

In FIG. 12b, the user's gaze direction has moved as shown by the pointer 1220 to the portion of the menu 1210, by directing the eyes towards the portion of the menu 1210. The menu 1210 is then made fixed (pinned) in relation to real space.

Figure 12C:
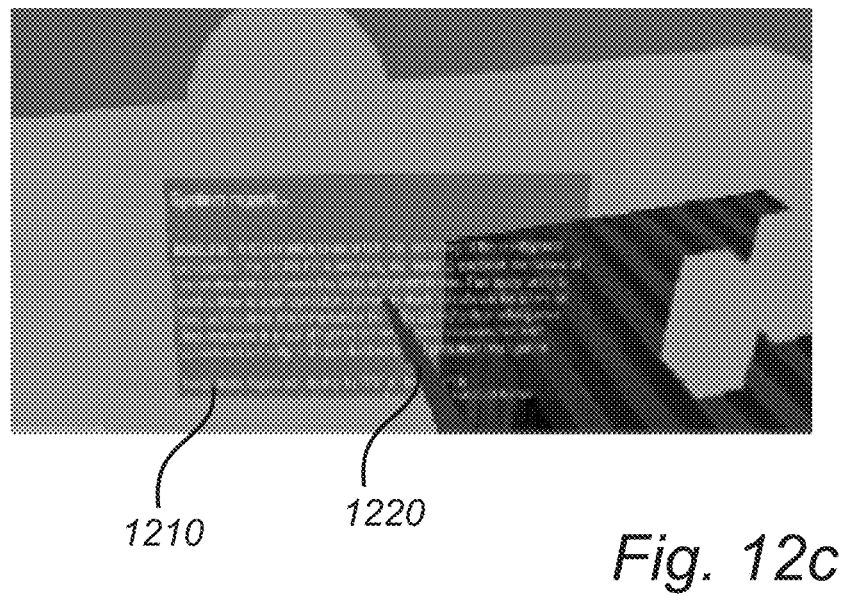

If FIG. 12c, the user's head has been directed downwards in a direction of previously not visible portions of the menu, such that these previously not visible portions of the menu 1210 have become visible. The user's gaze direction as shown by the pointer 1220 is still to the menu 1210 but now to portions of the menu 1210 previously not visible.

Figure 12D:
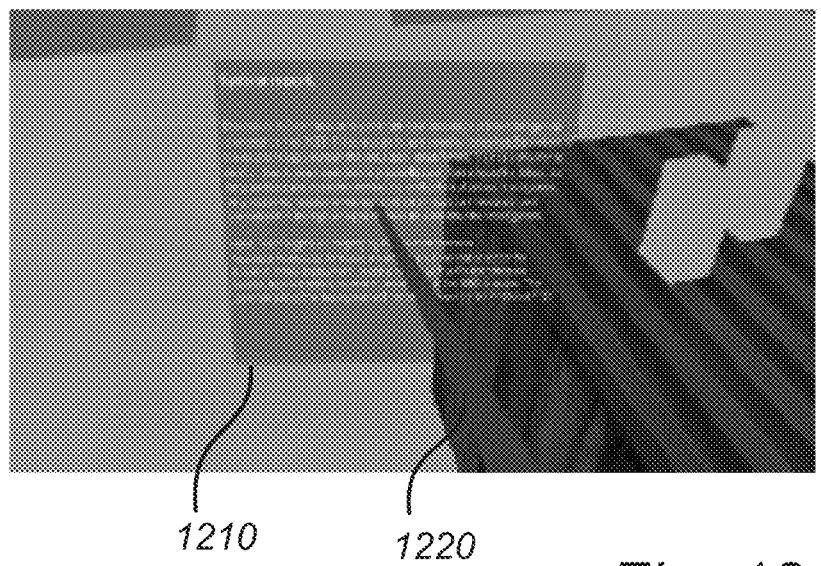

In FIG. 12d, the user's head has been directed so much downwards such that the complete menu 1210 is visible. The complete menu 1220 is then made fixed again in VR space in relation to the user's head as long as the user's gaze direction as indicated by the pointer 1220 is to the menu 1220.

If the user's gaze direction is moved away from the menu 1210, the view returns to only a portion of the menu 1210 being visible outside the center region of a user's view and fixed in VR space in relation to the user's head as shown in FIG. 12a.

In FIG. 12a the portion of the menu is shown at the bottom of the view. It is to be noted that the portion of the menu can be fixed at either side (left or right) or at the top of the view. In such cases the complete menu can become visible by directing the view to and fixing it on the portion of the menu and turning the head in a direction such that previously not visible portions of the menu will become visible, e.g. to the left if the portion of the menu is a right hand portion of the menu or up if the portion of the menu is a lower portion of the menu.

Furthermore, is to be noted that even though a menu in VR has been described in relation to FIGS. 11 and 12a-d, the portion can be of any VR object, such that only a portion of the VR object is visible and can be made visible according to the expansion method described hereinabove.

Methods of gaze based VR menu expansion in a VR system as disclosed herein may be implemented in an apparatus comprising circuitry configured to perform the method and/or in software, e.g. stored on one or more computer-readable storage media, including computer-executable instructions that, when executed by an apparatus, cause the apparatus to perform the method. The one or more computer-readable media aspect may for example be one or more non-transitory computer-readable media.

FIGS. 11 and 12a-d disclose gaze based VR menu in a VR system. However, the description hereinabove in relation to VR is equally applicable for AR systems. If a AR system is used the portion of the menu 1210 is fixed in a virtual space/to a virtual surface of the AR system in relation to the user's head. If the user's gaze is directed to the portion of the menu, the menu is made fixed (pinned) in the virtual space/to the virtual surface in relation to real space such that when the users head is moved in a direction of previously not visible portions of the menu, such previously not visible portions of the menu will become visible.

Methods of gaze based augmented reality (AR) menu expansion in an AR system as disclosed herein may be implemented in an apparatus comprising circuitry configured to perform the method and/or in software, e.g. stored on one or more computer-readable storage media, including computer-executable instructions that, when executed by an apparatus, cause the apparatus to perform the method. The one or more computer-readable media aspect may for example be one or more non-transitory computer-readable media.

Furthermore, is to be noted that even though a menu has been described in relation to FIGS. 11 and 12a-d, applications for AR can relate to any AR object, such that only a portion of the AR object is visible and can be made visible according to the expansion method described hereinabove.

A person skilled in the art realizes that the present invention is by no means limited to the preferred embodiments described above. On the contrary, many modifications and variations are possible within the scope of the appended claims.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The division of tasks between functional units referred to in the present disclosure does not necessarily correspond to the division into physical units; to the contrary, one physical component may have multiple functionalities, and one task may be carried out in a distributed fashion, by several physical components in cooperation. A computer program may be stored/distributed on a suitable non-transitory medium, such as an optical storage medium or a solid-state medium supplied together with or as part of other hardware, but may also be distributed in other forms, such as via the Internet or other wired or wireless telecommunication systems. The mere fact that certain measures/features are recited in mutually different dependent claims does not indicate that a combination of these measures/features cannot be used to advantage. Method steps need not necessarily be performed in the order in which they appear in the claims or in the embodiments described herein, unless it is explicitly described that a certain order is required. Any reference signs in the claims should not be construed as limiting the scope.

What is claimed is:

1. A method in an eye tracking system for providing an approximate gaze convergence distance of a user comprising:
   determining calibration data in relation to interpupillary distance between a pupil of a left eye and a pupil of a right eye of a user;
   determining, based on the determined calibration data, a gaze convergence function providing an approximate gaze convergence distance of the user based on a determined interpupillary distance of the user;
   receiving, from one or more imaging devices, one or more images of the left eye and the right eye of the user;
   determining a current interpupillary distance of the user based on the one or more images; and
   determining a current approximate gaze convergence distance based on the current interpupillary distance and the gaze convergence function.

2. The method of claim 1, wherein the step of determining calibration data comprises:
   receiving, from the one or more imaging devices, one or more calibration images of the left eye and the right eye of the user when the user is focusing at a known depth of field; and
   determining an interpupillary distance between the pupil of the left eye and the pupil of the right eye for the known depth of field based on the one or more calibration images,
   wherein the calibration data comprise the known depth of field in combination with interpupillary distance for the known depth of field.

3. The method of claim 1, wherein the gaze convergence function is defined as a binary function having a first value for interpupillary distances above a threshold value and a second value for interpupillary distances below the threshold value, wherein the threshold value is set to the interpupillary distance for the known depth of field.

4. The method of claim 1, wherein the known depth of field is selected, such that the interpupillary distance can be approximated as the interocular distance.

5. The method of claim 1, wherein the calibration data comprise approximations of eye ball diameter, and a distance from the imaging device to at least one of the eyes.

6. The method of claim 1, further comprising capturing the one or more images using the one or more imaging devices and one or more holographic mirrors, each holographic mirror having a reflection angle varying across its surface, such that with a predefined position of a corresponding imaging device of the one or more imaging devices, the magnification of a representation of an object in an image captured is constant over distance.

7. The method of claim 6, wherein the calibration data comprise an approximation of eye ball diameter.

8. The method of claim 1, wherein the step of determining calibration data comprises:
receiving, from the one or more imaging devices, one or more first calibration images of the left eye and the right eye of a user when the user is focusing at a first known depth of field;
determining a first interpupillary distance between the pupil of the left eye and the pupil of the right eye based on the one or more first calibration images;
receiving, from the one or more imaging devices, one or more second calibration images of the left eye and the right eye of the user when the user is focusing at a second known depth of field; and
determining a second interpupillary distance between the pupil of the left eye and the pupil of the right eye based on the one or more second calibration images,
wherein the calibration data comprise the first known depth of field in combination with the first interpupillary distance and the second known depth of field in combination with the second interpupillary distance.

9. The method of claim 8,
wherein the gaze convergence function is defined as a linear function within an interval of interpupillary distances; and
wherein the interval of interpupillary distances is between the first interpupillary distance for the first known depth of field and the second interpupillary distance for the second known depth of field, and wherein a value of the gaze convergence function for the first interpupillary distance is set to the first known depth of field and a value of the gaze convergence function for the second interpupillary distance is set to the second known depth of field.

10. The method of claim 1, wherein the gaze convergence function is defined as a linear function within an interval of interpupillary distances.

11. The method of claim 1, wherein determining a current interpupillary distance comprises:
receiving, from the one or more imaging devices, one or more current images of the left eye and the right eye of the user when the user is focusing at a current depth of field; and
determining a current interpupillary distance between the pupil of the left eye and the pupil of the right eye for the current depth of field based on the one or more current images.

12. An eye tracking system for providing an approximate gaze convergence distance of a user comprising circuitry configured to:
determine calibration data in relation to interpupillary distance between a pupil of a left eye and a pupil of a right eye of a user;
determine, based on the determined calibration data, a gaze convergence function providing an approximate gaze convergence distance of the user based on a determined interpupillary distance of the user;
receive, from one or more imaging devices, one or more images of the left eye and the right eye of the user;
determine a current interpupillary distance of the user based on the one or more images; and
determine a current approximate gaze convergence distance based on the current interpupillary distance and the gaze convergence function.

13. The eye tracking system of claim 12, wherein the circuitry is further configured to:
receive, from the one or more imaging devices, one or more calibration images of the left eye and the right eye of the user when the user is focusing at a known depth of field; and
determine an interpupillary distance between the pupil of the left eye and the pupil of the right eye for the known depth of field based on the one or more calibration images,
wherein the calibration data comprise the known depth of field in combination with interpupillary distance for the known depth of field.

14. The eye tracking system of claim 12, wherein the gaze convergence function is defined as a binary function having a first value for interpupillary distances above a threshold value and a second value for interpupillary distances below the threshold value, wherein the threshold value is set to the interpupillary distance for the known depth of field.

15. The eye tracking system of claim 12, wherein the circuitry is configured to select the known depth of field, such that the interpupillary distance can be approximated as the interocular distance.

16. The eye tracking system of claim 12, further comprising one or more holographic mirrors, each holographic mirror having a reflection angle varying across its surface, such that with a predefined position of a corresponding imaging device of the one or more imaging devices, the magnification of a representation of an object in an image captured is constant over distance.

17. The eye tracking system of claim 12, wherein the circuitry is further configured to:
receive, from the one or more imaging devices, one or more first calibration images of the left eye and the right eye of a user when the user is focusing at a first known depth of field;
determine a first interpupillary distance between the pupil of the left eye and the pupil of the right eye based on the one or more first calibration images;
receive, from the one or more imaging devices, one or more second calibration images of the left eye and the right eye of the user when the user is focusing at a second known depth of field; and
determine a second interpupillary distance between the pupil of the left eye and the pupil of the right eye based on the one or more second calibration images,
wherein the calibration data comprise the first known depth of field in combination with the first interpupillary distance and the second known depth of field in combination with the second interpupillary distance.

18. The eye tracking system of claim 12, wherein the gaze convergence function is defined as a linear function within an interval of interpupillary distances.

19. The eye tracking system of claim 12, wherein the eye tracking system is a head mounted system.

20. One or more non-transitory computer-readable storage media storing computer-executable instructions that, when executed by an apparatus, cause the apparatus to:
determine calibration data in relation to interpupillary distance between a pupil of a left eye and a pupil of a right eye of a user;
determine, based on the determined calibration data, a gaze convergence function providing an approximate gaze convergence distance of the user based on a determined interpupillary distance of the user;
receive, from one or more imaging devices, one or more images of the left eye and the right eye of the user;

determine a current interpupillary distance of the user based on the one or more images; and determine a current approximate gaze convergence distance based on the current interpupillary distance and the gaze convergence function.

\* \* \* \* \*